United States Patent
Grabenstetter et al.

(10) Patent No.: US 7,130,706 B2
(45) Date of Patent: Oct. 31, 2006

(54) SYSTEM AND METHOD FOR SCHEDULING A FABRICATION PROCESS

(75) Inventors: Douglas Herman Grabenstetter, South Elgin, IL (US); David Otey, Schererville, IN (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 10/665,180

(22) Filed: Sep. 18, 2003

(65) Prior Publication Data

US 2004/0111173 A1 Jun. 10, 2004

Related U.S. Application Data

(60) Provisional application No. 60/412,305, filed on Sep. 20, 2002.

(51) Int. Cl.
*G06F 19/00* (2006.01)
(52) U.S. Cl. .................. 700/100; 700/101; 700/103
(58) Field of Classification Search ........ 700/100–104; 705/7–9; 718/102, 103
See application file for complete search history.

(56) References Cited

U.S. PATENT DOCUMENTS 5,671,361 A * 9/1997 Brown et al. .............. 705/9
6,321,133 B1 * 11/2001 Smirnov et al. ............ 700/100
6,578,005 B1 * 6/2003 Lesaint et al. ................. 705/8
2004/0015971 A1 * 1/2004 Spoltore et al. ............ 718/102

OTHER PUBLICATIONS

Ho et al. "Minimizing the number of tardy jobs for m parallel machines" European Journal of Operational Research 84, pp. 343-355, 1995.*
Dauzere-Peres "Minimizing late jobs in the general one machine scheduling problem" European Journal of Operational Research 81, pp. 134-142, 1995.*

* cited by examiner

*Primary Examiner*—Leo Picard
*Assistant Examiner*—Steven R. Garland

(57) ABSTRACT

The present invention is a job scheduling system and method that provides enhanced on-time delivery (OTD) of a fabrication process. The present invention provides on-time delivery (OTD) of a fabrication process. A scheduling heuristic, referred to as Weighted Forward Algorithm (WFA), is applied to a set of fabrication jobs to reduce the weighted number of late delivery of a single machine with a setup. Certain exemplary embodiments can provide a system and method for scheduling a fabrication process, comprising the activities of: initializing a set of fabrication jobs to create a set of on time jobs, a set of late jobs and a set of jobs to be scheduled; normalizing job set by due date order and processing requirements; and determining if the set of on time jobs will meet scheduled due dates, and if not, then determining which job to move from the set of on time jobs and moving that job from the set of on time jobs to the set of late jobs.

12 Claims, 5 Drawing Sheets

SYSTEM AND METHOD FOR SCHEDULING A FABRICATION PROCESS

CROSS-REFERENCE TO RELATED APPLICATION

This application claims priority to, and incorporates by reference herein in its entirety, pending U.S. Provisional Patent Application Ser. No. 60/412,305, filed Sep. 20, 2002.

BACKGROUND

An entire fabrication process, for example the fabrication of sheet metal, consists of many machines and is considered as having a job-shop environment, where jobs have their own process routings visiting these machines. However, the decision as to which jobs are to be processed on which individual machine is made via the company's production routings. Setups on machines incur when machines change from processing one job to another. Thus, the problem is defined here as a single machine-scheduling problem with setup. Moreover, jobs often have different levels of importance (priorities). The levels of importance are assigned by weight numbers, the higher the weights, the more important the jobs are. The company measures its performance by means of weighted number of late delivery. Currently, the Weighted Shortest Processing Time (WSPT) heuristic is used by conventional fabrication scheduling systems to address this fabrication problem. However, these conventional fabrication systems yield poor or inconsistent results

SUMMARY

The present invention is a job scheduling system and method that provides enhanced on-time delivery (OTD) of a fabrication process. A scheduling heuristic, referred to as Weighted Forward Algorithm (WFA), is applied to a set of fabrication jobs to reduce the weighted number of late delivery of a single machine with a setup.

Certain exemplary embodiments can provide a system and method for scheduling a fabrication process, comprising the activities of: initializing a set of fabrication jobs to create a set of on time jobs, a set of late jobs and a set of jobs to be scheduled; normalizing job set by due date order and processing requirements; and determining if the set of on time jobs will meet scheduled due dates, and if not, then determining which job to move from the set of on time jobs and moving that job from the set of on time jobs to the set of late jobs. It will be appreciated that the fabrication system and method continues until all jobs are scheduled.

BRIEF DESCRIPTION OF THE DRAWINGS

A wide array of potential embodiments can be better understood through the following detailed description and the accompanying drawings in which.

DEFINITIONS

When the following terms and/or notations are used herein, the accompanying definitions apply:

HMI—a human machine interface used for monitoring, programming, and/or controlling automation machines and/or processes. An HMI can, for example, interpret communications from a human operator of an industrial plant to an automated machine controller, and vice versa.

HMI user screen—a visual display of an HMI renderable via a monitor.

render—make perceptible to a human.

rendition—a perceptible result of rendering.

J Number of jobs (or monthly customer orders) to be scheduled $os_j$ Order size of job j, for j=1, 2, ..., J $p_j$ Loading and processing times of job j, for j=1, 2, ..., J $s_j$ Setup time (for associate tools) of job j, for j=1, 2, ..., J $rm_j$ Remove time (for associate tools) of job j, for j=1, 2, ..., J $p_{eff,j}$ Effective processing time of job j, for j=1, 2, ..., J, where $p_{eff,j} = s_j + p_j + rm_j$ $d_j$ Due date of job j, for j=1, 2, ..., J $C_j$ Completion time of job j, for j=1, 2, ..., J $C_{max}$ Makespan, or $\max(C_1, C_2, \ldots, C_J)$ $L_j$ Lateness of job j, for j=1, 2, ..., J, which is defined as $L_j = C_j - d_j$.

$L_{max}$ Maximum lateness, or $\max(L_1, L_2, \ldots, L_J)$ $U_j$ Unit penalty imposed on job j if the job j is late, that is $$U_j = \begin{cases} 1 & \text{if } C_j > d_j \\ 0 & \text{otherwise} \end{cases}$$

DETAILED DESCRIPTION

Certain exemplary embodiments provide a system and method for scheduling a fabrication process, comprising the activities of: initializing a set of fabrication jobs to create a set of on time jobs, set of late jobs and a set of jobs to be scheduled; normalizing job set by due date order and processing requirements; and determining if the set of on time jobs will meet scheduled due dates, and if not, then determining which job to move from the set of on time jobs and moving that job from the set of on time jobs to the set of late jobs. It will be appreciated that the fabrication system and method continues until all of the jobs are scheduled.

Figure 1:
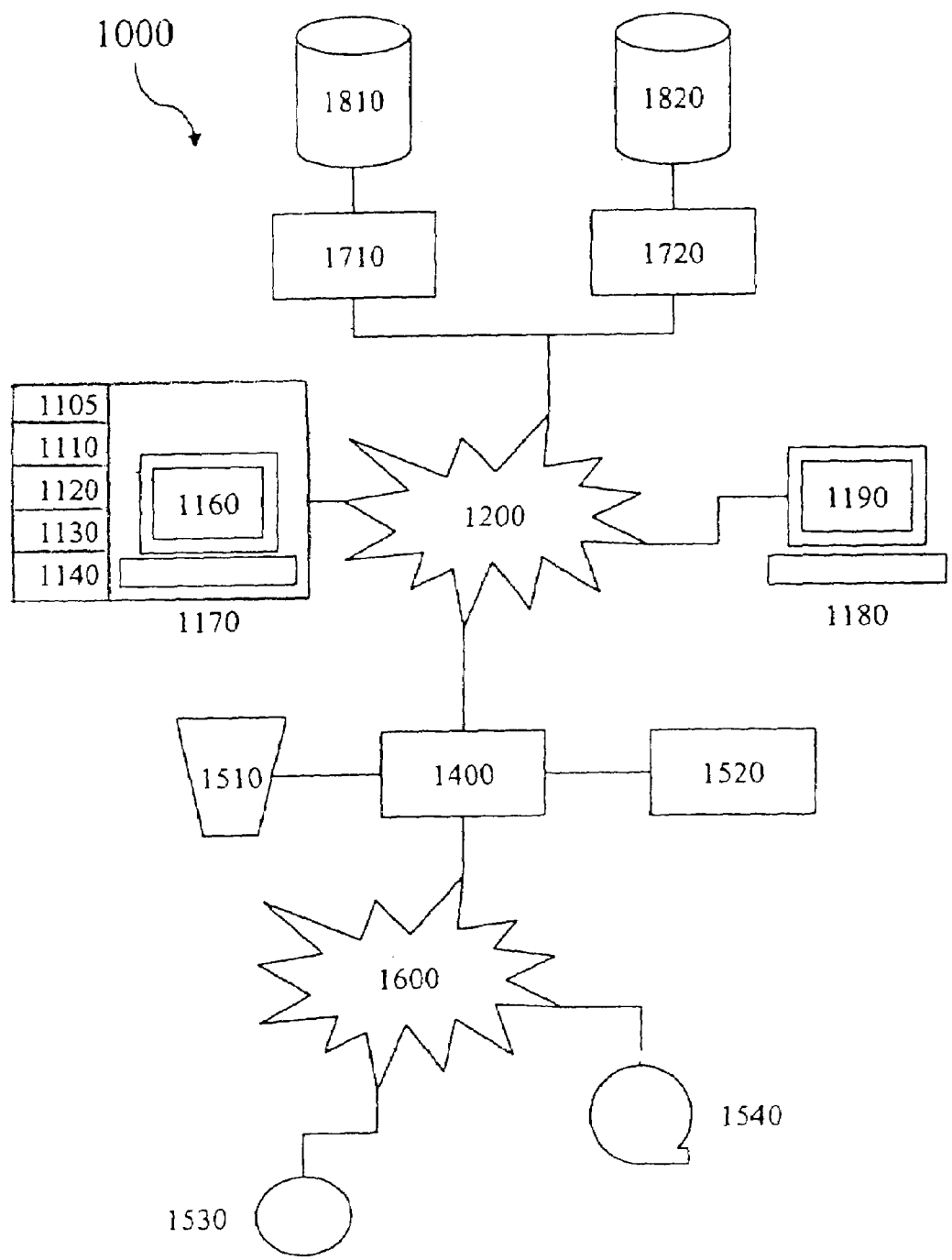
FIG. 1 is a block diagram of an exemplary embodiment of a system 1000.

FIG. 1 is a simplified block diagram of an exemplary embodiment of a system 1000. A Fabrication Scheduling Engine 1105 can interface with and/or be comprised within an HMI 1110. HMI 1110 can also comprise an HMI navigation engine 1120 which can render a user interface 1130 of an HMI user screen 1140 via a rendering 1160 displayed on an information device 1170.

HMI 1110, HMI navigation engine 1120, user interface 1130, and/or HMI user screen 1140 can be based on one or more proprietary and/or non-Web-based protocols, that is one or more protocols other than a standard or Web protocol such as HTML, SGML, XML, XSL, etc.

As used herein, the term "engine" means a hardware, firmware, and/or software-based device adaptable to process machine-readable instructions to perform a specific task. An engine can act upon information by manipulating, analyzing, modifying, and/or converting information. An engine can communicate with an HMI, another engine, a processor, a memory, and/or an I/O device. It will be appreciated that fabrication scheduler engine 1105 performs the specific task of scheduling fabrication jobs. These fabrication jobs can include but are not limited to jobs for development, manufacturing and/or assembly applications.

Fabrication scheduler engine 1105 can provide a user screen or its output can be displayed by one of many HMI user screens 1110. Rendering 1160 can be one of many renderings. For example, via information device 1170 and/or an additional information device 1180, the same or a different user can perceive a different rendering 1190 of HMI 1110 and/or any of its components. Fabrication scheduler engine 1105, HMI 1110, HMI navigation engine 1120 can run locally on information device 1170,1180 and/or can be provided via a network 1200 from a server 1400. Via a direct connection, or via a network 1600, server 1400 can obtain information from process devices 1510,1520, 1530,1540, such as one or more sensors, actuators, data acquisition devices, control devices, automation devices, information devices, etc. Server 1400 can also provide commands and/or information such as a fabrication schedule to process devices 1510,1520,1530,1540.

Via network 1200, information devices 1170,1180, and/or server 1400 can communicate information with information servers 1710, 1720, to which any number of information stores 1810,1820 (e.g., archives, databases, memory devices, etc.) can be connected. Information servers 1710, 1720 can serve any of internal information, external information, pictures, graphics, video, animation, alarms, archived information, web information, process information, application programming interfaces ("API's"), supervisory control and data acquisition ("SCADA") extensions, configuration tools, software, databases, and/or specifications, etc.

Figure 2:
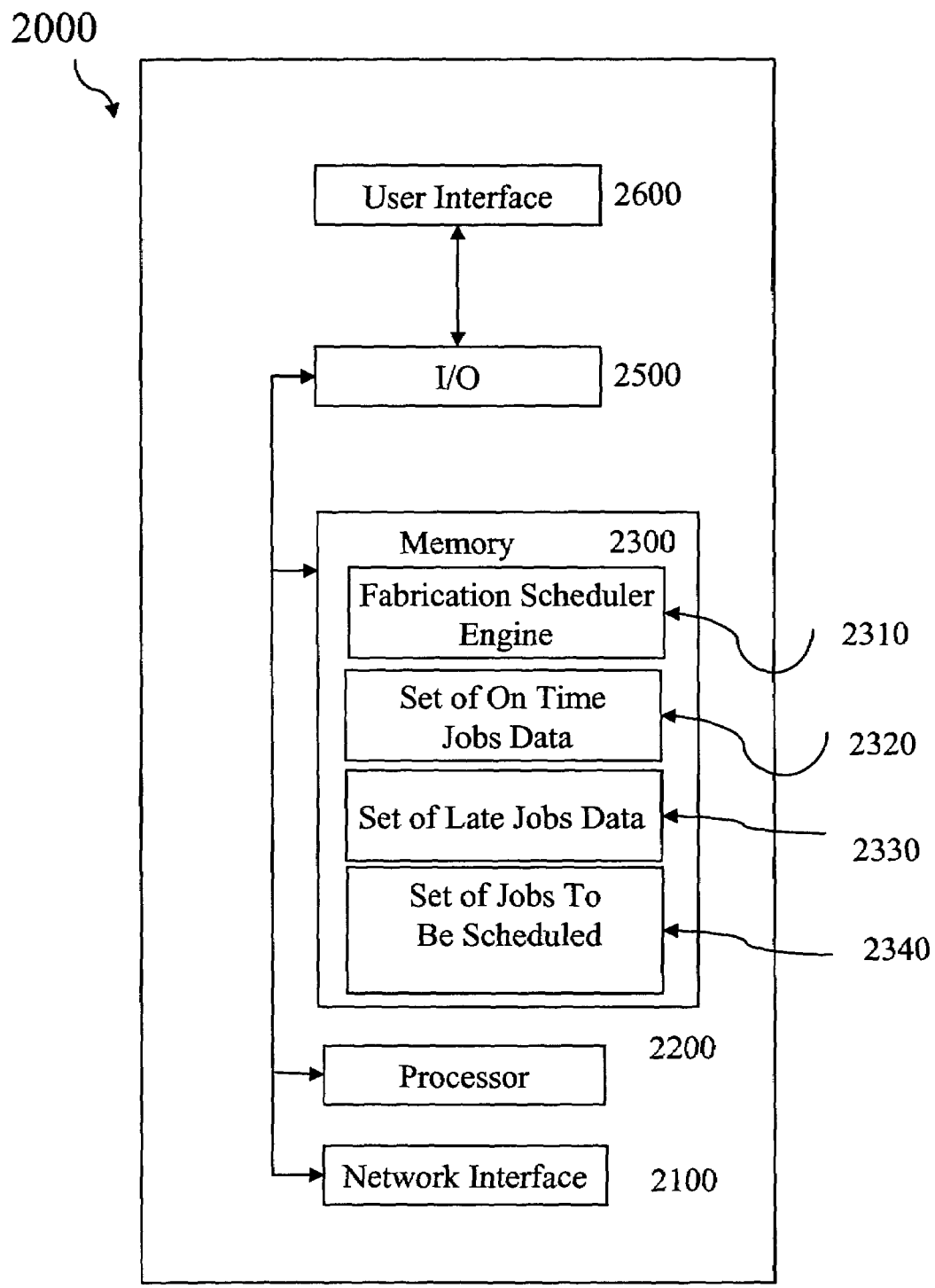
FIG. 2 is a block diagram of an exemplary embodiment of an information device 2000.

FIG. 2 is a simplified block diagram of an exemplary embodiment of an information device 2000, which can represent any of information device 1170,1180, server 1400, server 1710, and/or server 1720 of FIG. 1.

Information device 2000 can include well-known components such as one or more network interfaces 2100, one or more processors 2200, one or more memories 2300 containing instructions and data, and/or one or more input/output (I/O) devices 2500, etc. Via one or more I/O devices 2500, a user interface 2600 can be provided.

Instructions and memories 2300 include a fabrication scheduler engine 2310, and data including a Set of On Time Jobs 2320, a Set of Late Jobs 2330 and a Set of Jobs To Be Scheduled 2340.

As used herein, the term "information device" means any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, one or more user interfaces, etc.

As used herein, the term "network interface" means any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

As used herein, the term "processor" means a device for processing machine-readable instruction. A processor can be a central processing unit, a local processor, a remote processor, parallel processors, and/or distributed processors, etc. The processor can be a general-purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) that has been designed to implement in its hardware and/or firmware at least a part of an embodiment disclosed herein.

As used herein, a "memory device" means any hardware element capable of data storage. Memory devices can comprise non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc.

As used herein, the term "firmware" means machine-readable instructions that are stored in a read-only memory (ROM). ROM's can comprise PROMs and EPROMs.

As used herein, the term "I/O device" means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

As used herein, the term "haptic" means both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

As used herein, the term "user interface" means any device for rendering information to a user and/or requesting information from the user. A user interface can include textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc.

A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

In certain exemplary embodiments, via one or more user interfaces 2600, fabrication scheduler engine 2310 can create, request, provide, receive, revise, and/or delete one or more job fabrication schedules. In certain exemplary embodiments, fabrication scheduler engine 2310 communicates with HMI 1110 where one or more HMI user screens can be created, requested, received, rendered, viewed, revised, and/or deleted. In certain exemplary embodiments, an HMI navigation engine, running on and/or via an information device 2000, can provide any or all of these functions.

Figure 3:
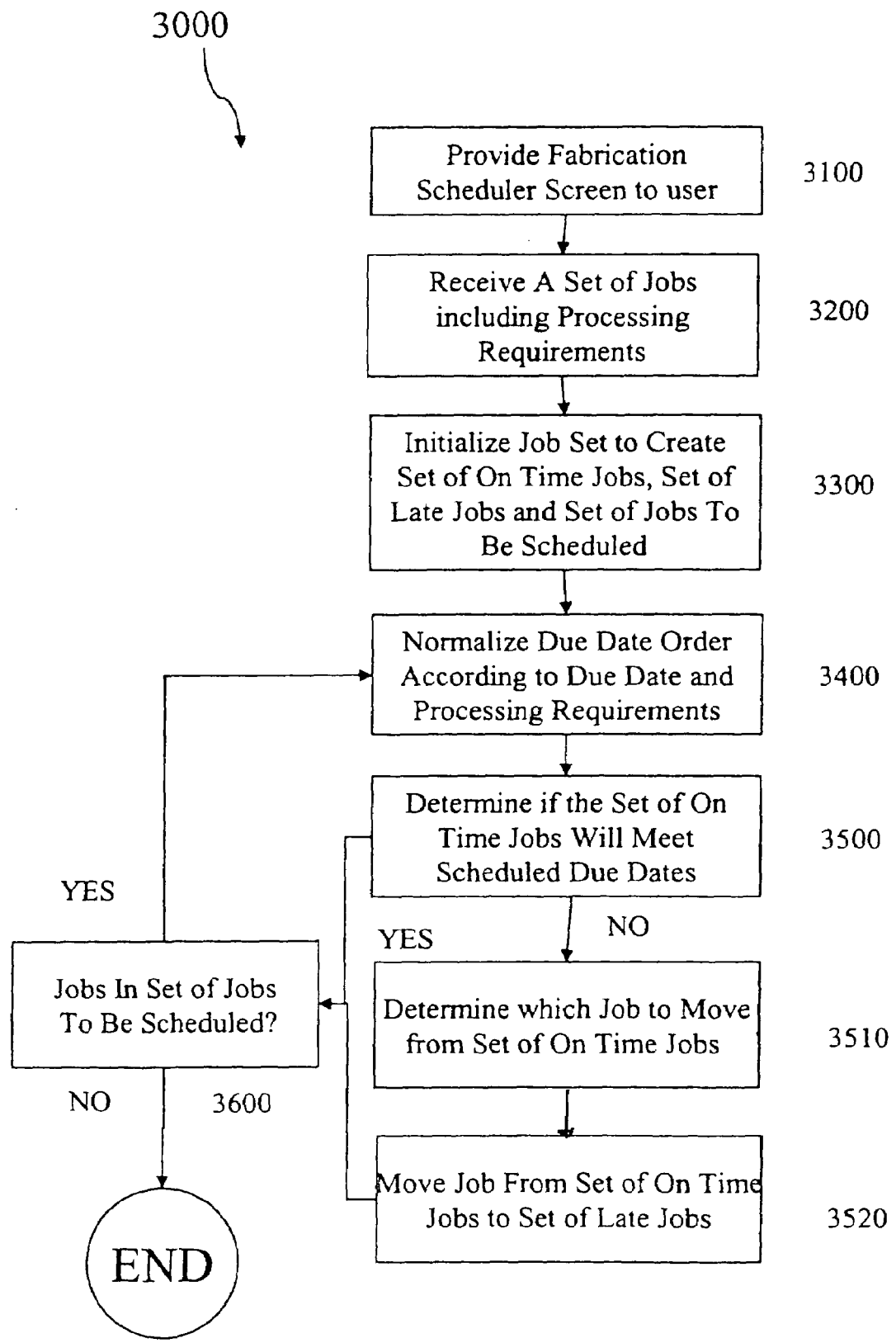
FIG. 3 is a flow chart of an exemplary embodiment of a method 3000.

FIG. 3 is a simplified flow chart of an exemplary embodiment of a method 3000. At activity 3100, a fabrication scheduler engine 1105 and/or an HMI 1110 displays a fabrication jobs scheduler screen. At activity 3200, the fabrication scheduler engine at exemplary information device 1160 receives fabrication scheduler data for scheduling jobs. It will be appreciated that fabrication scheduler engine 1105 may automatically perform a job scheduler method of the present invention without interaction with a user.

At activity 3300, job scheduler engine 1105 initializes a job set to create a set of on time jobs 2320, a set of late jobs 2330 and a set of jobs to be scheduled 2340. Activity 3300 can be expressed as follows:

Set $S^0=\{\ \}$ (set of on time jobs), $S^1=\{\ \}$ (set of late jobs), and $S=\{1, 2, \ldots, J\}$ (set of jobs left to be scheduled).

At activity 3400, job scheduler engine 1105 normalizes the jobs according to jobs due and processing requirements. A job is selected that has the lowest value based a due date of job and order size. Activity 3400 can be expressed as follows:

Let $j^*$ denote the job that satisfies $d_{j^*}=\min(d_j/os_j)$

Add $j^*$ to $S^0$.

Delete $j^*$ from S.

Go to Activity 3500.

At activity 3500, job scheduler engine 1105 determines if the Set of On Time Jobs 2320 will meet scheduled due dates. If not, at activity 3510, job scheduler engine 1105 determines which job to move from the Set of On Time Jobs 2320 and at activity 3520 moves the determined job from the Set of On Time Jobs 2320 to the Set of Late Jobs 2340. If the Set of On Time Jobs 2320 will meet the scheduled due dates then activity 3600 is performed. Activity 3500, 3510 and 3520 can be expressed as follows:

If $$\sum_{j \in S^0} p_{\text{eff},j} < d_{j^*},$$

go to activity 3600; otherwise let $k^*$ denote the job that satisfies $p_{k^*}=\max\{(p_j/os_j)+(s_j/os_j)+(rm_j/os_j)\}$. When $k^*$ is found, remove it from $S^0$ and add it to $S^1$.

It will be appreciated that in an alternative embodiment, activity 3400 and activity 3500 can be expressed as follows:

Activity 3400

Let $j^*$ denote the job that satisfies $d_{j^*}=\min(d_j-os_j)$

Add $j^*$ to $S^0$.

Delete $j^*$ from S.

Go to activity 3500.

Activity 3500

If $$\sum_{j \in S^0} p_{\text{eff},j} < d_{j^*},$$

go to activity 3600; otherwise let $k^*$ denote the job that satisfies $p_{k^*}=\max\{(p_j-os_j)+(s_j/os_j)+(rm_j/os_j)\}$. When $k^*$ is found, remove it from $S^0$ and add it to $S^1$.

It will be appreciated that in Activity 3400 term $$\sum_{j \in S^0} p_{\text{eff},j} < d_{j^*}$$

checks whether job j* finishes earlier than its due date. If not (where $$(\text{where} \sum_{j \in S^0} p_{\text{eff},j} > d_{j^*}),$$

in activity 3510, the job (referred to as job k*) with the lower volumes, implying lower weights, and having longer processing time, is selected as the job removed from the Set of On Time Jobs 2320 and in Activity 3520, is placed into the Set of Late Jobs 2330. By removing the longest processing time job in the current Set of On Time Jobs 2320, can cause more on time jobs that require shorter processing times. One of ordinary skill in the art will understand that this is accomplished by selecting in Activity 3510, the job with highest $p_j/os_j$ ratio in one embodiment, and the highest difference $p_j - os_j$ in another embodiment.

It will be appreciated that $(s_j/os_j)$ and $(rm_j/os_j)$ represents the setup and remove times per piece for each job. The setup and remove times are not included into the actual processing time because these two time components fluctuate more than the actual processing time. Consequently, they can be updated more conveniently if they are defined separately from the actual processing time.

At activity 3600, job scheduler engine 1105 determines if there are jobs in the Set of Jobs To Be Scheduled 2340. If there are jobs, then job scheduler engine 1105 performs activity 3400. If there are no jobs, then job scheduler engine 1105 ends the scheduling process. Activity 3600 can be expressed as follows:

If S={ }, stop; otherwise return to Activity 3400.

It will be appreciated that the order sizes are directly used in lieu of the weights in the expression and calculation of the objective value of activities 3400 and 3500. It will further be appreciated that the direct use of the order sizes can increase the accuracy of results in regards to the objective values. In certain embodiments, jobs with larger order sizes (higher weights) and earlier due dates should be processed first in order to reduce the weighted number of late jobs. This is provided by selecting the job with the lowest $d_j/os_j$ ratio and lowest difference $d_j - os_j$ to be processed next as in activity 3500.

Figure 4:
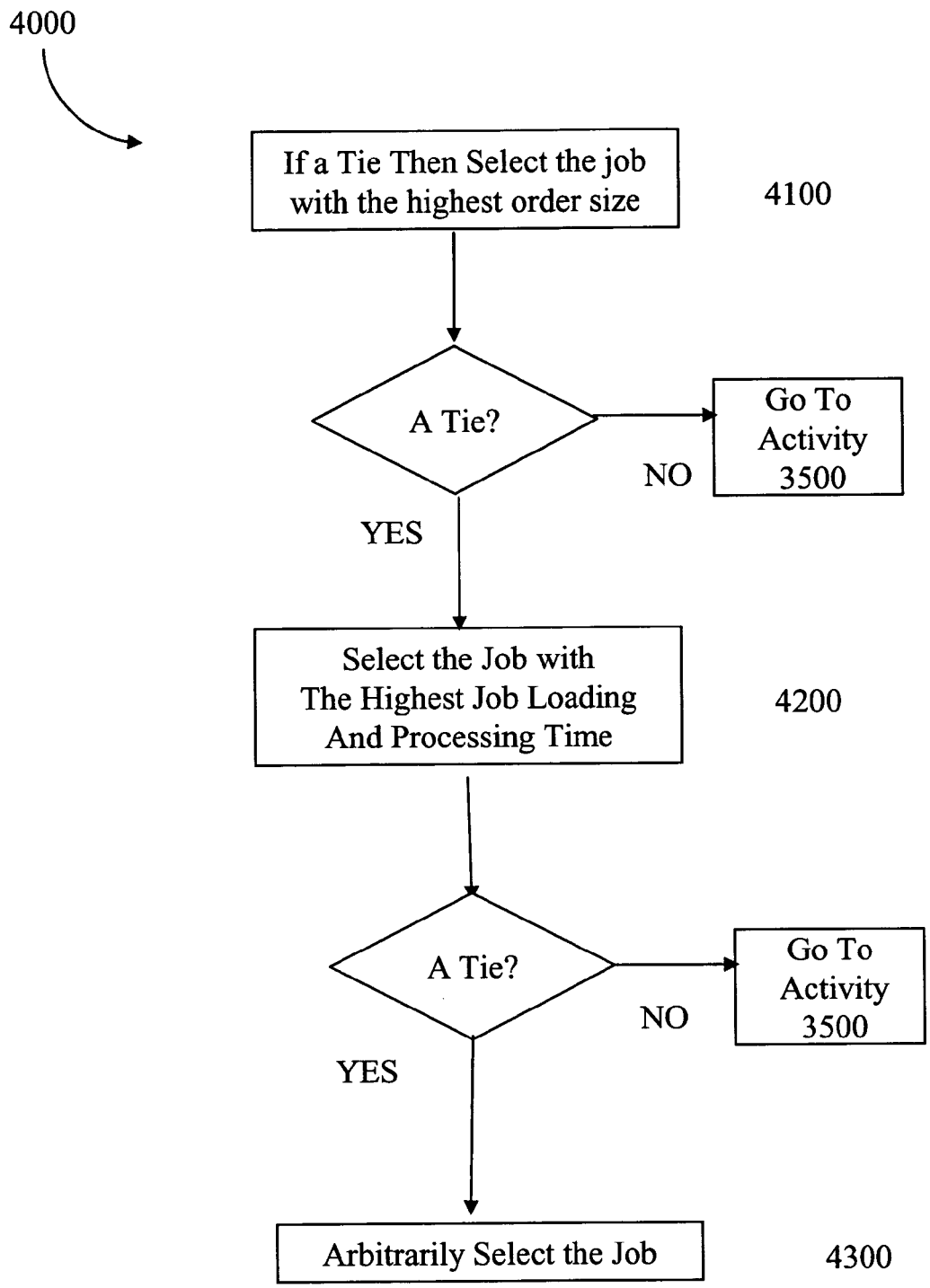
FIG. 4 is a flow chart of an exemplary embodiment of a method 4000.

FIG. 4 is a simplified flow chart of an exemplary embodiment of a method 4000. It will be appreciated that if in Activity 3400, a tie results from $d_j/os_j$ or $d_j - os_j$ being equal for two or more jobs, in activity 4100, the job with the highest order size is chosen to encourage (weighted) on time performance. If a tie still results, in activity 4200, the job with the highest $p_j$ is chosen. One of ordinary skill in the art will understand that this is performed to encourage higher machine utilization by reducing the number of setups. If a tie still occurs, then, in activity 4300, the sequence of the tied jobs is arbitrarily chosen since this selection only negligibly affects the result.

Figure 5:
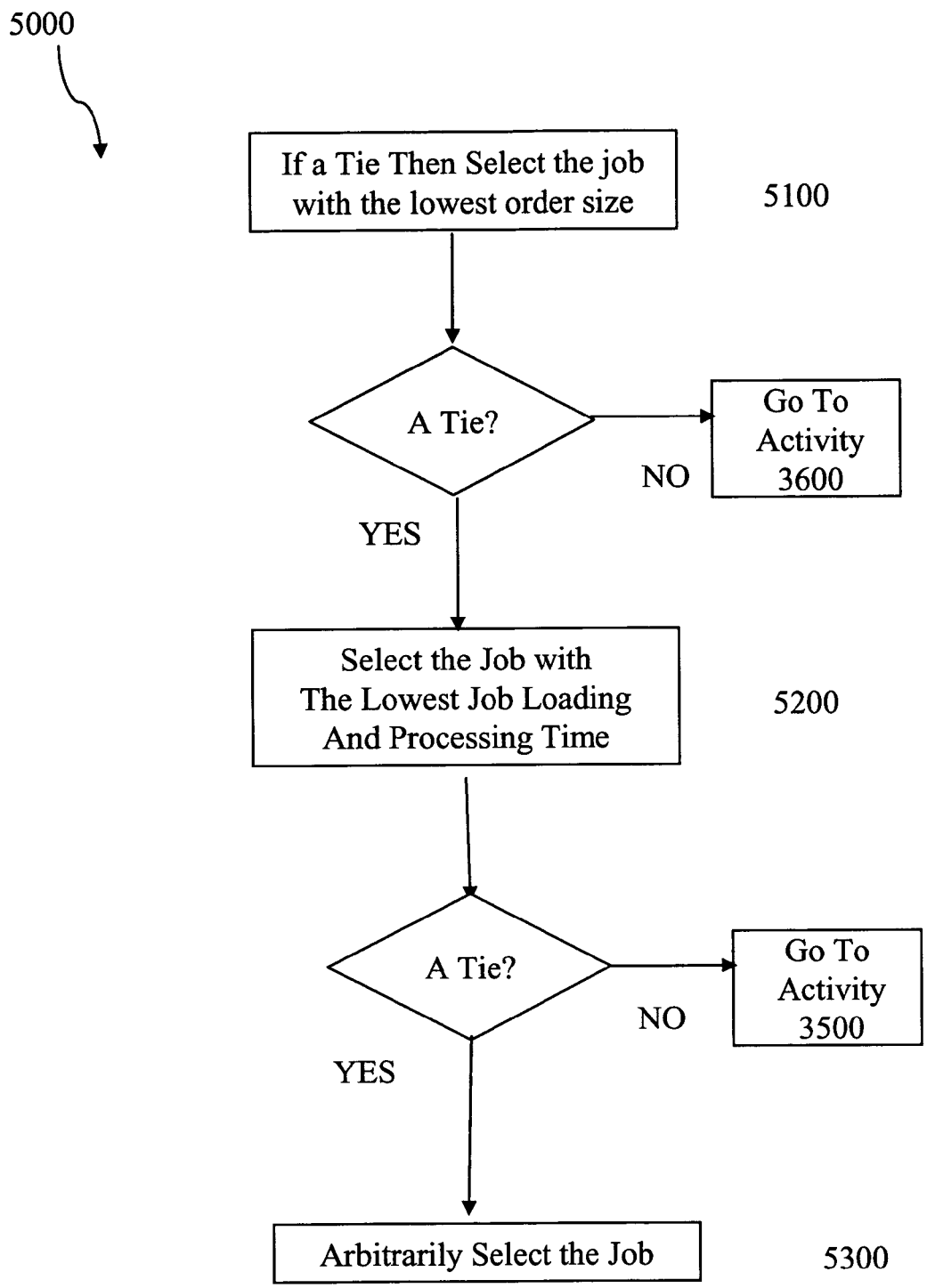
FIG. 5 is a flow chart of an exemplary embodiment of a method 5000.

FIG. 5 is a simplified flow chart of an exemplary embodiment of a method 5000. It will be appreciated that if in activity 4500 a tie results from $\{(p_j/os_j)+(s_j/os_j)+(rm_j/os_j)\}$ or $\{(p_j-os_j)+(s_j/os_j)+(rm_j/os_j)\}$ being equal for two or more jobs, in activity 5100, the job with the lowest order size is selected and p is placed into the Set of Late Jobs 2330. If a tie still occurs, then, in Activity 5200, the job with the lowest $p_j$ is chosen and placed into the Set of Late Jobs 2330 because this job requires more setups. If a tie still occurs, then, in activity 5300, the sequence of the tied jobs is arbitrarily chosen since this selection only negligibly affects the result.

What is claimed is:

1. A method for scheduling a fabrication process comprising the activities of:
    initializing a job set to create a set of on time jobs, a set of late jobs and a set of jobs to be scheduled and storing the job set in a memory device; and
    operating an information processing system to select a job with a minimum value based on due dates and processing requirements, and if the selection results in a tie between a plurality of jobs then selecting a job from the plurality of tied jobs with a highest order size, and adding the selected job to the set of on time jobs, determine if the set of on time jobs will not exceed scheduled due dates, and modify the set of on time jobs in the memory device if the set of on time jobs exceeds the scheduled due dates.

2. The method of claim 1, further comprising receiving a set of jobs including processing requirements.

3. The method of claim 1, further comprising calculating the minimum value for selecting the job.

4. The method of claim 1, further comprising calculating a processing time to determine a job to move from the set of on time jobs to the set of late jobs in the memory device.

5. The method of claim 4, further comprising moving the determined job from the set of on time jobs to the set of late jobs in the memory device.

6. The method of claim 1, further comprising determining if there are jobs in the set of jobs to be scheduled.

7. The method of claim 1, further comprising selecting a job with a highest job loading and processing time if the selecting a job with a highest order size results in a tie.

8. The method of claim 1, wherein the fabrication process includes jobs for fabricating metal works.

9. A method for scheduling a fabrication process comprising the activities of:
    initializing a job set to create a set of on time jobs, a set of late jobs and a set of jobs to be scheduled and storing the job set in a memory device; and
    operating an information processing system to select a job with a minimum value based on due dates and processing requirements, and if the selection results in a tie between a plurality of jobs then selecting a job from the plurality of tied jobs with a lowest order size, and adding the selected job to the set of on time jobs, determine if the set of on time jobs will not exceed scheduled due dates, and modify the set of on time jobs in the memory device if the set of on time jobs exceeds the scheduled due dates.

10. The method of claim 9, further comprising selecting a job with a lowest job loading and processing time if the selecting a job with a lowest order size results in a tie.

11. A machine-readable medium containing machine executable instructions for activities, the instructions in the machine-readable medium being accessible by an information device and compnsing:
    initializing a job set to create a set of on time jobs, a set of late jobs and a set of jobs to be scheduled;
    selecting a job with a minimum value based on due dates and processing requirements, and if the selection results in a tie between a plurality of jobs then selecting a job from the plurality of tied jobs with a highest order size, and adding the selected job to the set of on time jobs;

determining if the set of on time jobs will not exceed scheduled due dates; and modifying the set of on time jobs if the set of on time jobs exceeds the scheduled due dates.

12. A device for providing a representation of user screens for an HMI comprising:

means for initializing a job set to create a set of on time jobs, a set of late jobs and a set of jobs to be scheduled;

means for selecting a job with a minimum value based on due dates and processing requirements, and if the selection results in a tie between a plurality of jobs then selecting a job from the plurality of tied jobs with a highest order size, and adding the selected job to the set of on time jobs;

means for determining if the set of on time jobs will not exceed scheduled due dates; and means for modifying the set of on time jobs if the set of on time jobs exceeds the scheduled due dates; and means for providing a representation.

* * * * *